(12) United States Patent
Lambert

(10) Patent No.: US 7,599,886 B1
(45) Date of Patent: Oct. 6, 2009

(54) SYSTEM AND METHOD FOR ALLOCATING MORTGAGE REPAYMENT FUNDS

(76) Inventor: Ken Lambert, 66 Deer Hill Rd., Brentwood, NH (US) 03833

( * ) Notice: Subject to any disclaimer, the term of this patent is extended or adjusted under 35 U.S.C. 154(b) by 0 days.

(21) Appl. No.: 11/748,671

(22) Filed: May 15, 2007

Related U.S. Application Data

(60) Provisional application No. 60/747,264, filed on May 15, 2006.

(51) Int. Cl.
*G06Q 40/00* (2006.01)
*G06Q 10/00* (2006.01)

(52) U.S. Cl. .............................. 705/39; 705/1
(58) Field of Classification Search .................. 705/39
See application file for complete search history.

(56) References Cited

U.S. PATENT DOCUMENTS

| | | | | | |
|---|---|---|---|---|---|
| 5,987,436 | A * | 11/1999 | Halbrook | ................... | 705/36 R |
| 6,148,293 | A * | 11/2000 | King | ............................ | 705/35 |
| 2003/0225685 | A1* | 12/2003 | Dickerson | .................... | 705/38 |
| 2004/0128233 | A1* | 7/2004 | Jarzmik | ....................... | 705/38 |
| 2004/0254879 | A1* | 12/2004 | Dickerson | .................... | 705/38 |
| 2005/0278246 | A1* | 12/2005 | Friedman et al. | .............. | 705/38 |
| 2006/0178987 | A1* | 8/2006 | Ostergren | .................... | 705/40 |
| 2006/0229975 | A1* | 10/2006 | Wiatrak | ........................ | 705/38 |
| 2008/0167999 | A1* | 7/2008 | Morazan | .................... | 705/36 R |

OTHER PUBLICATIONS

"Option ARM Mortgages-The What, Why & Now", 2005, LynxBanc Mortgage Corporation, pp. 1-2.*

"What is a graduated payment mortgage?" NextTag, Apr. 14, 2006.*

"Non-Traditional Loans Require Financial Discipline", The Washington Post, Washington, D.C.: Mar 25, 2006. p. F.10.*

United First Financial Website, "Money Merge Account Introduction", http://www.u1stfinancial.com/ 10 pages printed from the Internet Sep. 5, 2007.

CMG Financial Website, "Home Ownership Accelerator", http://www.cmgfs.com/partner/ 3 pages printed from the Internet Sep. 5, 2007.

* cited by examiner

*Primary Examiner*—Thomas A Dixon
*Assistant Examiner*—Mohammad Z Shaikh
(74) *Attorney, Agent, or Firm*—Bourque and Associates

(57) ABSTRACT

A system and method for computing mortgage amortization so as to allow the borrower to pay down the principal portion of his or her mortgage faster includes calculating traditional and modified principal and interest repayment amounts and calculating a baseline or average principal and interest amount payable over the life of the loan. An interest Index rate is established. Principal payments are placed in an interest-bearing account administered by the lender. Changes in interest rates are computed on a monthly basis. When the current monthly interest rate is less than the initial Index rate, the difference in interest payments received needed to fund the loan and the amount paid by the homeowner are split between the homeowner and the lender. When the current monthly interest rate is greater than the initial Index rate, additional funds must be withdrawn from one or more established accounts or collected directly from the homeowner to fund the loan for that month. Principal payments and any funds left in the homeowner's interest-bearing account are used to reduce the principal of the loan.

2 Claims, 3 Drawing Sheets

SYSTEM AND METHOD FOR ALLOCATING MORTGAGE REPAYMENT FUNDS

CROSS-REFERENCE TO RELATED APPLICATIONS

The present application is related to and claims priority from U.S. provisional patent application No. 60/747,264 filed May 15, 2006 and incorporated fully herein by reference.

TECHNICAL FIELD

The present invention relates to mortgages and more particularly, to a system and method for calculating and amortizing a mortgage and for allocating mortgage payment funds so as to allow the borrower to pay down the principal portion of his or her mortgage faster.

BACKGROUND INFORMATION

There are many existing home or commercial mortgage amortization methods. One of the most common is a conventional fixed rate mortgage where the borrower pays a fixed monthly amount based on a fixed interest rate for the duration of the mortgage (for example, 30 years). The advantage of this type of mortgage is that the borrower knows what his or her payment will be for the entire duration of the loan. A disadvantage of this type of mortgage is that if the prevailing loan or mortgage interest rates drop or the prevailing interest rates on various savings or investment accounts rise, the borrower can not take advantage of this situation without refinancing the loan which is often a costly undertaking.

In years past, the fixed rate mortgage loan has been the most common type of loan. This type of loan suited most Americans who typically stayed in one home for all or nearly all of their entire adult lives. Most homeowners, however, are now not staying in one home their entire adult lives but rather, are moving on the average of every seven years or less.

Another common mortgage amortization method is an adjustable rate mortgage (ARM). In this method, the borrower's interest rate changes on a periodic basis (for example, every month; every quarter; or every year) and therefore, the loan repayment amount changes accordingly. This type of mortgage amortization method suits many homeowners who are either moving frequently or who expect significant increases in salary within a short period of time. The disadvantage of this type of mortgage is that should interest rates rise, the borrower will see a corresponding rise in his or her loan payment.

Lastly, an additional mortgage payment methodology is commonly referred to as the "biweekly" mortgage which attempts to reduce the interest paid by the borrower by making payments every two weeks instead or once per month. This results in lower eventual interest payments and the actual payment of one additional loan payment per year. The difficulty for some borrowers with this methodology is that some borrowers may not have the additional funds required for this payment method or may not qualify for this payment method.

Accordingly, what is needed is a novel system and method for providing a loan amortization calculation method which allows the borrower and lender to share in the accumulated surpluses from the loan repayment; while still ensuring that the lender will make a sufficient minimum return on their investment covering their costs of lending the money, servicing the loan and a reasonable profit. Borrowers benefit by having more of their monthly mortgage payment go toward paying down the principal balance rather than interest payments. The lender can earn a higher return based on the way it invests the principal portion of the borrower's monthly payment and can also pass some of the bank's higher return back to the homeowner or borrower in the form of additional principal pay downs, benefiting both the lender and the borrower.

SUMMARY

The present invention features a method of processing loan payments so as to allow the borrower to pay down the principal portion of his or her mortgage faster. The method comprises the acts of receiving, by an automated system, a loan principal amount, a loan repayment computational time frame, an initial loan interest Index value, and a loan interest value. In response to the received loan principal amount, the loan repayment computational time frame and the loan interest value, the present invention next computes, using an automated system such as a computer running appropriate computer software, a monthly loan repayment amount. The monthly loan repayment amount includes a conventional principal loan repayment component and a conventional loan interest component The method in accordance with the present invention continues by calculating, by the automated system, of a modified loan repayment schedule. The modified loan repayment schedule includes a modified monthly principal component value and a modified monthly interest component value, and wherein the sum of the modified monthly principal component value and the modified monthly interest component value is equal to the sum of the conventional principal loan repayment component and the conventional loan interest component. The method of the present convention next receives a loan repayment amount from a borrower. The loan repayment amount includes the modified monthly principal component value and the modified monthly interest component value.

In response to receiving the loan repayment amount from the borrower, the method of the present convention continues by transferring the modified monthly principal component value to an interest bearing account. The method also computes a present loan interest Index value. The method further computes, using an automated system, the difference between the initial loan interest Index value and the present loan interest Index value. If the computed difference is a positive value, the method of a present invention performs the act of causing an amount equal to the difference between interest on the loan computed using the initial loan interest Index value and interest on the loan computed using the present loan interest Index value to be deposited into one or more interest-bearing accounts, wherein one half of the deposited amount is allocated to a lender's benefit and one half of the deposited amount is allocated to a borrower's benefit.

If the computed difference is a negative value, the present method computes loan interest required using the present loan interest Index value and determines if there are enough funds in the borrower's benefit portion in the interest-bearing account to pay this amount. If there are enough funds in the borrower's benefit portion of the interest-bearing account, the method withdraws the required computed loan interest. If there are not enough funds in the borrower's benefit portion of the interest-bearing account, the required computed loan interest amount is collected/withdrawn from another account or if there are not enough funds in a predetermined order of accounts, directly from the borrower.

In the preferred embodiment, the act of collecting the required computed loan interest from another account proceeds in the following order: first in an amount equal to no more than the difference between the modified monthly principal component value and the conventional principal component value paid to date by the borrower; next in an amount equal to no more than one half the amount deposited in the interest-bearing account allocated to the lender; and lastly directly from the borrower by means of an additional monthly payment charge.

The act of calculating, by the automated system, of the loan modified monthly principal component value and the modified monthly interest component value may include calculating an average monthly loan principal repayment value over the loan repayment computational time frame and calculating an average monthly interest component value based on the overall loan interest rate.

It is important to note that the present invention is not intended to be limited to a system or method which must satisfy one or more of any stated objects or features of the invention. It is also important to note that the present invention is not limited to the preferred, exemplary, or primary embodiment(s) described herein.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
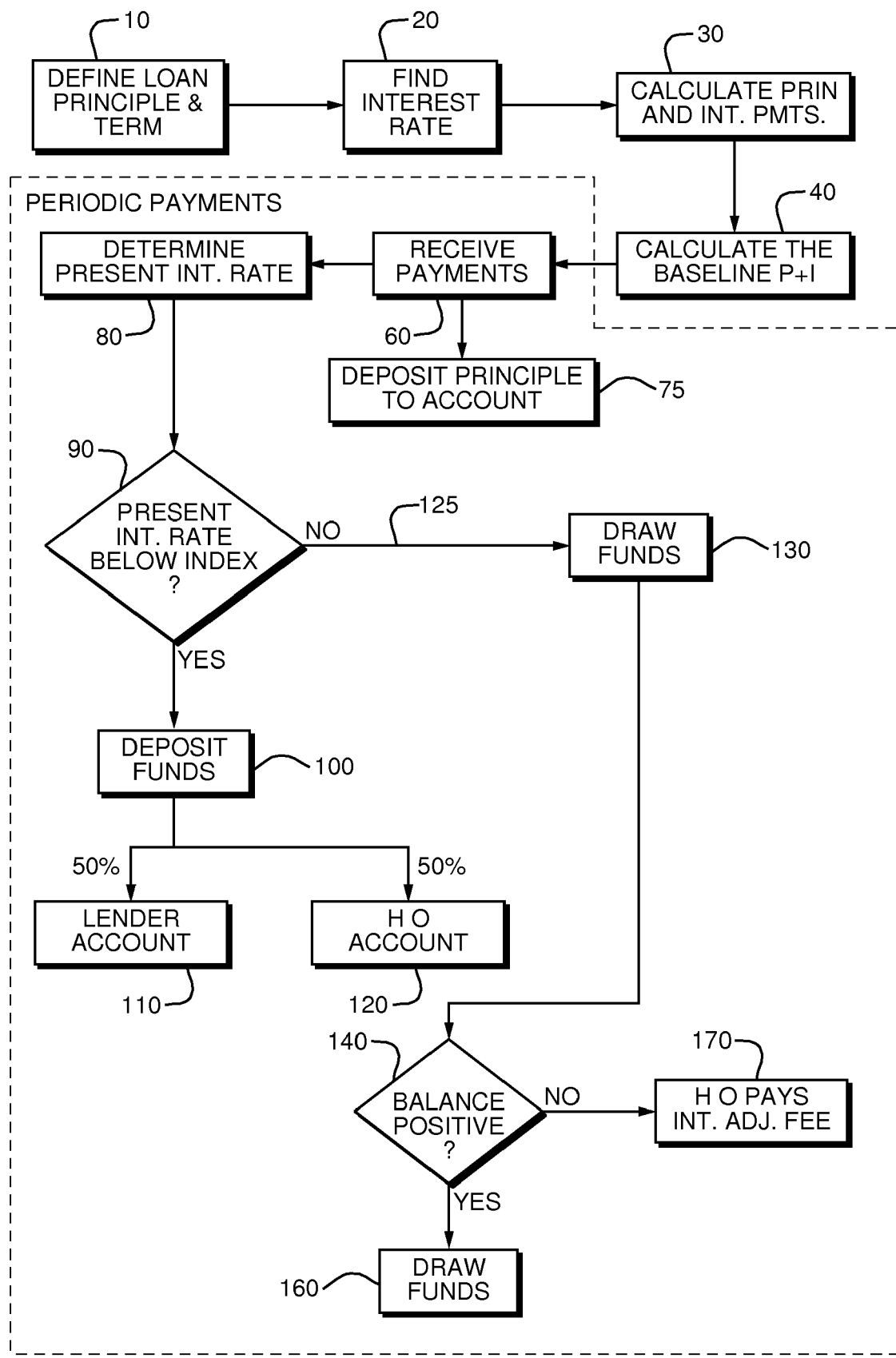
FIG. 1 is functional block diagram of the method according to the present invention.

The present invention features a system and method for allocating mortgage repayment funds. For purposes of describing the invention disclosed and claimed herein, the present invention may from time to time or in the examples be referred to as the "Alternative Mortgage Fund" or "AMF" for short. In addition, for sake of simplicity and clarity, examples noted are based on yearly overviews only. In truth, the present invention and method of allocation will take place on a month-by-month basis. The system and method according to the present invention begins by first defining at least the interest rate, the loan, principal amount and the duration or term of the loan, act 10, FIG. 1. For example, the loan may consist of a principal amount of $250,000 at an interest rate of 6.5% for a loan period of 30 years. The present invention will be explained also in connection with FIG. 2 which shows representative actual computations for such a loan computed in accordance with the teachings of the present invention.

After determining or allocating the overall interest rate for the loan (typically but not necessarily based on current market trends in the fixed rate mortgage industry), act 20, the method of the present invention continues on to calculate the principal and interest payments. The principal and interest payments will be computed in accordance with standard actuarial and financial methodologies using a fixed interest rate (for example, 6.5%) for a fixed period of time (for example, 30 years).

The method of the present invention next continues to compute "baseline" principal and interest amounts. The "baseline" principal and interest amount is computed as the "average" monthly principal and/or interest amount which would be paid by the borrower to the lender over the entire life of the loan. Furthermore, the means of calculating the principal and interest amounts to be paid utilizing the method of the present invention can be readily seen in FIG. 3. For a numerical example, as can be seen in columns 34 and 36 of FIG. 2, the initial principal payment calculated in accordance with the teachings of the present invention will be $460.22 while the initial interest payment will be $1119.95.

Figure 2:
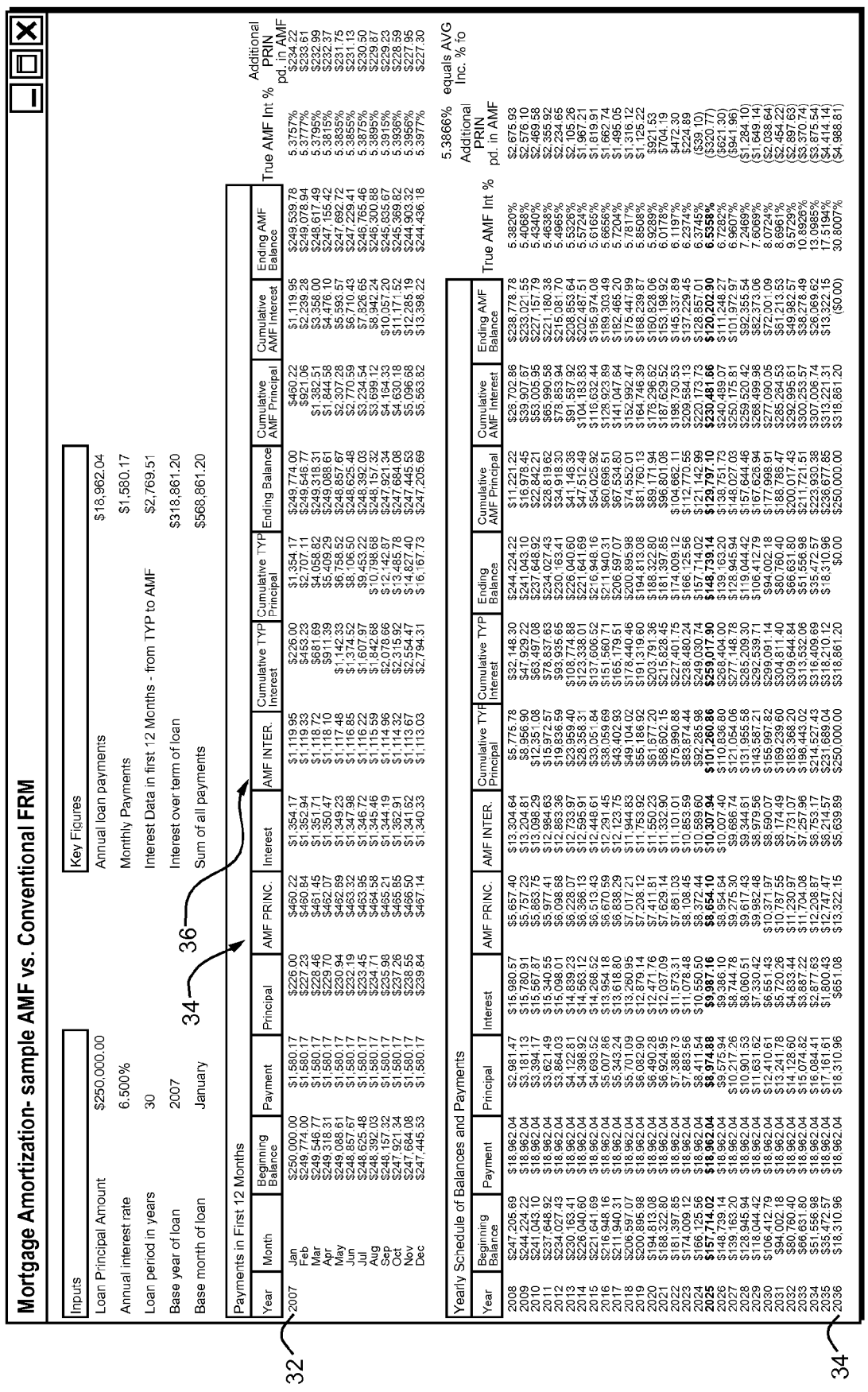
FIG. 2 is a chart illustrating the breakdown for a sample mortgage versus a conventional fixed rate mortgage illustrating the method of the present invention.

In contrast, as shown in line 32 of FIG. 2, a standard 30 year fixed-rate loan having an interest rate of 6.5% would have an initial first month's principal allocation payment of $226 and an initial first month's interest payment of $1354.17. Although the total monthly payments are the same utilizing the method of the present invention and conventional fixed amortization methods, it is apparent that the method of the present invention allows a borrower to pay more toward principal and less toward interest payments during the initial term of the loan.

After preparing all of the computations, which are accomplished utilizing readily available computer hardware and software appropriately programmed, the method of the present invention continues by receiving a monthly loan payment, act 60. Using the baseline calculations, the appropriate principal amount (including both the "standard" loan amortization principal amount and the "extra" principal amount (the difference between the principal amount computed in accordance with teachings of the present invention and shown in column 34 and the standard principal amount) will be deposited in a principal account, act 75.

The principal account is an interest bearing account. Although preferably an insured account, this is not a limitation of the present invention. Examples, without limitation, of interest-bearing accounts contemplated by the present invention include money market accounts, mutual funds, savings accounts, CDs, stocks and stock accounts and bonds and bond accounts. The interest earned in this account accumulates and is utilized to eventually reduce principal amount and to fund interest repayments, if required, as will be explained in greater detail below.

At the onset of the loan, the lender will establish an "Index" upon which interest payments for the life of the loan computed in accordance with the present invention will be calculated. There are many well-known such indices and without limitation, examples of such an "Index" include the London Interbank Offered Rate (LIBOR); the 12 month Treasury Average (TMA); the Cost of Deposit Index (CODI); the 11th District Cost of Funds Index (COFI); and the Cost of Savings Index (COSI).

The interest rate of the loan will typically be set at a value which is a predetermined amount above the "margin" selected by the lender which in essence establishes a base return that the lender wishes to maintain on the loan to ensure profitability. For example, most lending institutions want to maintain a minimum of approximately 1.87% margin and thus, an initial "index" of 4.63% would dictate a loan having an interest rate of at least 6.5% (index rate of 4.63 plus a margin of 1.87).

Each month, the method of the present invention will determine the present value of the selected "interest" index, act 80. If the present monthly value of the Index is less than the computed initial or original loan Index, act 90, the difference yields an amount which will be deposited in two accounts, act 100. One half of the difference are allocated to the lender's account, act 110, in a lender's Rate Surplus Funds (RSF) account, while one half of the funds are allocated to the borrower or homeowner, act 120, in a homeowner's savings account. In this manner, if the interest Index rate drops, both the lender and borrower will share equally the resulting difference between the original interest amount previously computed and the actual interest required for the lender to borrow the funds.

If, in act 90, it is determined that the present monthly value of the Index is more than the computed original index, additional interest monies must be withdrawn from deposited funds (or otherwise collected from the borrower) to make up the shortfall, act 130. The funds are withdrawn from the following accounts in the following order and only to the extent there are sufficient funds: first from the homeowners savings account described in 120 herein; secondly from the principal account described in act 75 herein but ONLY in an amount not exceeding the "extra" principal deposited in the account as the homeowner will never lose the standard principal amount paid into that account; thirdly from the lender's (RSF) account described in connection with act 110 but ONLY in an amount not exceeding one-half of the balance in that account; act 140, and lastly if none of the accounts have sufficient finds, any deficiency will be collected for that month directly from the homeowner. The method of the present invention determines if the balance in the appropriate next in line account is positive, act 140 and if so, the funds are withdrawn, act 160. If there are not enough funds in the borrower's account to be withdrawn to pay the shortfall, the homeowner or borrower will have to pay the interest adjustment costs, act 170.

At the termination of the loan, whatever monies are left in the lender's account 110 is profit for the lender. Whatever is left in the homeowners or borrower's account 120 is earmarked toward paying additional loan principal.

During the initial years of the loan and up to and including approximately the 17th year of the loan, the amount of principal paid by the borrower each month is not in actuality deducted from the principal amount of the loan. Rather, these amounts are deposited into the interest-bearing account and the homeowner is essentially getting "credit" for paying the principal down but in reality, the lender is using this money to earn additional money. The interest earned from this account is used to both assist in paying monthly loan costs (generally 50%) as well as continuing to compound within the account (generally 50%).

Figure 3:
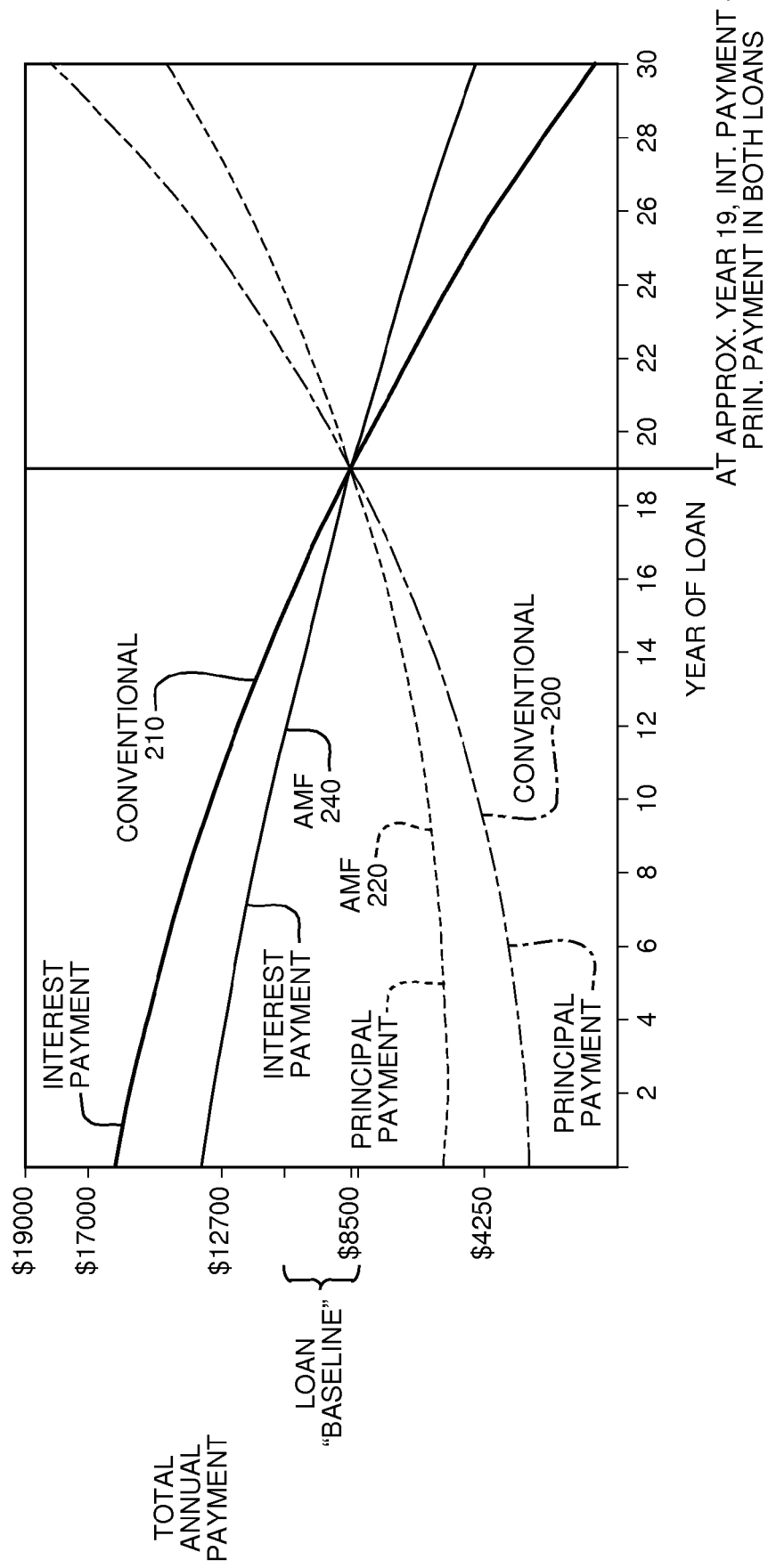
FIG. 3 is a graph illustrating payment amounts for a loan calculated in accordance with the teachings of the present invention versus a loan repayment calculated in accordance with a standard fixed rate, fixed term mortgage calculation.

FIG. 3 illustrates the comparison between the principal and interest payment of a conventional 30-year fixed-rate loan at 6.5% lines 200 and 210 respectively and the principal and interest payment amounts of a loan computed in accordance with the teaching of the present invention lines 220 and 240 respectively. As shown in this graph, at approximately 19 years after the inception of the loan, the interest and principal payments are equal in both types of loans. As can also be seen by line 34 in FIG. 2, at the end of the loan, the total principal and interest paid is the same in both types of loans. The advantage to the borrower comes in the early years of the loan and thus, for a borrower intending to stay less than the full term of the loan and indeed less than approximately 19 years after inception of the loan, there is a potential significant savings in interest payment and additional principal pay down/repayment utilizing the mortgage amortization and computation method of the present invention.

By way of example, the following (and the description in Table 1 herein) sets forth an exemplary loan repayment transaction over the first four years of the loan. The following assumes a $250,000 loan amount at a 6.5% interest rate. The lender may choose to charge "points" as well as various lender fees which may be placed in the lender's (RSF) account for future use or, the Lender may wish to use/extract these initial fees from the loan closing and NOT add them to the Lender's account. This example assumes an initial interest Index rate of 4.63%.

During the first year, the homeowner will pay a total of $18,962 to the lender. Using conventional 30 year fixed-rate mortgage repayment schedules, the conventional interest paid would be $16,167.73 while conventional principal paid would be $2794.40. Using the average or baseline computations of the present invention, the present method will allocate $5,568 to principal and $13,394.04 to interest payments. Note that the borrower can never lose the conventional principal repayment amount of $2794.40. Only the difference between this amount and the AMF principal amount can be used to fund interest shortages as will be explained below. Accordingly, during the first year, the homeowner earns a credit for $2773.60 more in principal payment and paid a corresponding amount less in interest payments. Although paying less interest may costs a homeowner some amount in lost mortgage interest tax deductions, overall, the homeowner is several thousand dollars ahead.

From the lender's perspective, the first year saw the homeowner pay $13,394 in interest while it cost the lender to borrow or otherwise fund the $250,000 loan, leaving a remainder of $1819. Of this remainder, $1569 is part of the annual operating expenses (AOE) of the lender in maintaining the loan while $250 ($\frac{1}{1000}^{th}$ of the loan amount) is deposited into the lender's Corporate Contingency (savings) account. The lender's corporate contingency account is developed by the Lender as a "hedge" account against loan late payments and non-payments by some potential borrowing customer. These amounts are pooled between all of the Lender's loans. The principal account will receive $236.64 in interest assuming a money market account rate of 4.25%. Accordingly the principal account now has a value of $5804.64.

During the second year, the borrower pays an additional $18,962 of which $13,300.20 is allocated to interest while $5,661.84 is allocated to principal. Assuming the current interest rate does not fluctuate from the initial loan interest index rate, the lender will receive $13,300 in interest payments of which it will cause the lender $11,575 to fund the loan, leaving a remainder of $1725. When the $244 portion of the interest from the principal account is added to this amount, the total dollars available to the Lender (this Year) equals $1,969. Of this amount, $250 will go into the lender's Corporate Contingency account; $125 will be paid to the mortgage broker/loan officer (if applicable); $1569 (0.62% of the loan amount) will be retained by the lender as its annual operating expenses while the remaining $25 will go into the lender's RSF savings account for a total expense of $1969.

The principal account will contain $5,804 from the previous year and $5,662 from the current year. Assuming a money market interest rate of 4.25%, an additional $487 will be earned in interest. Of this amount, $244 will be used towards this year's expenses (as noted in previous paragraph) while the remainder will stay in the account for next year—thereby compounding more interest revenue.

During the third year, the annual payments of $18,962 are allocated with $13,200 going to interest payments and $5,762 going to principal payments. Assuming a true funding cost of $11,575, the lender has $1625 remaining from the interest payment plus $366 from the Principal account's earned interest-which totals $1991. From the $1991 available, $250 goes to its general reserve savings accounts; $125 is paid as brokers fees; and $1569 is allocated to the total annual operating expenses of the lender, which leaves $47 as the remainder which goes into the lender's savings account. The principal account will now have a value of $17,235 consisting of $11,230 from previous years; $243.50 from last year's interest rollover; and $5,762 from this years principal payments. Assuming an interest rate of 4.25%, an additional $732.50 will be earned in interest. Of this amount, $366.25 will be used to fund this year's loan expenses as noted above.

During the fourth year, the borrower will again pay in total payments with $13,124 allocated to interest and allocated to principal. Deducting the bank's cost of for the loan against the interest paid, $1549 will remain, which is added to the $493 available from the Principal Account's interest—totaling $2,042. Of this amount, $250 will go into the lender's reserve account; $125 will be paid to the mortgage broker as a fourth year broker's fee; $1569 will be allocated towards the total operating expenses of the loan (0.62% of the loan amount) while $98 will go into the lender's account.

TABLE 1

Loan/Fund Management & Lender Details (assuming no INDEX monthly changes)
*Fully showing first 4 years of loan ONLY
The following is based on the minimum initial rate spread of 1.87 (between INDEX and the avg 30 FRM rate)
this is the AMF's worst-case/lowest profit scenario At loan closing: AMF is based one the current avg. national rates and points for a 30 yr FRM - typically
as published by HSH (or equivalent). In this example, the rate was 6.5% + points.
The points (if applicable) paid can go directly in the Lenders RSF- and will continue
to roll over as needed.
In addition to points, there can be Lender fees. $995 might be a typical amount for
the Lender to charge. The breakdown of this $995 might be:
    $350 - origination fee (to broker)
    $300 - underwriting fee
    $345 - loan processing fee For after the following years - example (given all assumption stated separately- 250K loan, etc.)

After 1st Year:

| | CONV 30 FRM: | AMF: |
|---|---|---|
| INT paid | $16,167.73 | $13.394.04 |
| PRIN paid | $2,794.40 note | $5,568.00 |
| Total- | $18,962 | $18,962 |

*Note: The borrower can never lose this amount the conventional PRINC paid. The funds that can be "lost" are the additional AMF PRINCIP-and only when Index rises, etc.

For H.O- Earned $2773.60 more PRINCIPAL    see Note
Paid $2773.60 less INTEREST (this COSTS the HO $776 in lost mortgage interest deductions)
    Overall, ahead net $1,997 for Year #1

For Lender-
Borrowing the $250K PRIN month to month (@ 4.63% 1M LIBOR) =     $11,575
Interest paid by HO for 1st year = $13,394
Bank cost of 250K loan = $11,575

Remaining = $1,819 equals $250
General Reserve (savings or so-called "Contingency Account") 1/1000 of loan PRIN $0 1st year brokers fee (none)
0.62% of $250K loan     $1,569 Total Annual Operating Expenses (AOE)

(for clarity-not listing the points paid at Closing which could be part of the Lender's RSF; this amount and percentage will vary based on national avgs.)

PRIN paid = $5568 (in a Money Market Account) + 4.25% (=$236.64)     $5,804.64    rolls into next year
Balance of Lender's Rate Surplus Fund (not figuring points paid at closing) =     $0
after the first Year the Lender has ZERO true loan profits or $0 in the "RSF" as I term it here.

TABLE 1-continued

```
After 2nd Year:
CONV 30 FRM:                        AMF:
INT paid   $15,980.58               $13,300.20
PRIN paid   $2,981.40                $5,661.84

Total-      $18,962                 $18,962
For H.O-  Earned $2,680.44 more PRINCIPAL
          Paid $2680.44 less INTEREST (this COSTS the HO $750 in lost
          mortgage interest deductions)
                    Overall, ahead net $1,930 for Year #2
For
Lender-
          Borrowing the $250K PRIN month to month (@ 4.63% 1M           $11,575
          LIBOR) =
Interest paid by HO for 2nd         $13,300
year =
Bank cost of 250K loan =            $11,575

Remaining =                         $1,725 equals    $250
General Reserve (savings account) 1/1000 of loan PRIN
                                                     $125 2nd year brokers    Fee
                    0.62% of $250K                   $1,569 Total Annual Oper  Exp (AOE)
                    loan
                                                     $25
Remainder goes into Lender's RSF (after using $243.50 portion
listed below)
PRIN paid = $5804 (from roll-over) + $5662 (this year's PRIN paid) = $11,467 × 4.25% = $487
($243.50 used for this year's expenses/$243.50 rolls
over)
Balance of Lender's Rate Surplus Fund (not figuring points paid at      $25
closing) =
After 3rd Year:
CONV 30 FRM:                        AMF:
INT paid   $15,781.00               $13,200.00
PRIN paid   $3,181.00                $5,762.00

Total-      $18,962                 $18,962
For H.O-  Earned $2581 more
          PRINCIPAL
          Paid $2581 less INTEREST (this COSTS the HO $723 in lost mortgage
          interest deductions)
                    Overall, ahead net $1,858 for Year #3
For
Lender-
          Borrowing the $250K PRIN month to month (@ 4.63% 1M           $11,575
          LIBOR) =
Interest paid by HO for 2nd         $13,200
year =
Bank cost of 250K loan =            $11,575

Remaining =                         $1,625 equals    $250
General Reserve (savings account) 1/1000 of loan PRIN
                                                     $125 3rd year brokers    fee
                    0.62% of $250K                   $1,569 Total Annual Oper  Exp (AOE)
                    loan
                                                     $47
Remainder goes into the Lender's
RSF
PRIN paid = $11,230 + $243.50 (from roll-over) + $5762 (this year's PRIN paid) = $17,235 × 4.25% = $732.50
($366.25 used for this year's expenses and $366.25
rolls over)
Balance of Lender's Rate Surplus Fund (not figuring points paid at      $72
closing) =
After 4th Year:
CONV 30 FRM:                        AMF:
INT paid   $15,567.00               $13,124.00
PRIN paid   $3,395.00                $5,838.00

Total-      $18,962                 $18,962
For H.O-  Earned $2444 more
          PRINCIPAL
          Paid $2444 less INTEREST (this COSTS the HO $684 in lost mortgage interest deductions)
                    Overall, ahead net $1,760 for Year #4
For
Lender-
          Borrowing the $250K PRIN month to month (@ 4.63% 1M           $11,575
          LIBOR) =
Interest paid by HO for 2nd         $13,124
```

TABLE 1-continued

```
year =
Bank cost of 250K loan =                    $11,575

Remaining =                                 $1,549 equals    $250
General Reserve (savings account) 1/1000 of loan PRIN
                                                             $125  4th year brokers      fee
                                                             $1,569 Total Annual Oper    Exp (AOE)
                                                                    0.62% of $250K
                                                                    loan
                                                             $98
Remainder goes into the Lender's
RSF
PRIN paid = $16,992 + $366.25 (from roll-over) + $5838 (this year's PRIN paid) = $23,196 × 4.25% = $985.85
($492.92 used for this year's expenses while $492.92
rolls over)
Balance of Lender's Rate Surplus Fund (not figuring points paid at                              $170
closing) =
(in this example with these figures, after 4 years,
Bank could only ose 50% of this- or $85-towards interest shortfalls if Index rises AND the borrower
has no other funds accrued to pay for the interest)
Key Balances and Stats for the remainder of this loan term-
assuming it goes the
        full 30 years (based on current example and assumptions ONLY):
(note that these figures represent the LOWEST profit scenario - given the minimum initial rate spread as
noted above)
After Year 5 - Yearly Broker Commission ends ($125 goes to Rollover
amount into next year)/H.O.
    ahead net $1693/Lenders RSF for year is
    $92
After Year 7 - H.O. ahead net $1512/Lenders RSF for year is $112/H.O. ahead
overall $12,356
After Year 10 - H.O. ahead net $1196/Lenders RSF for year is $95/Last year
contributing $250 to
    General Savings Acct/H.O. ahead overall
    $16,268
After Year 12-Lenders RSF for year is
$299
After Year 14 - Amount of H.O. - paid INTEREST this Year is finally LESS than the
$11,575 needed.
    Balance and expenses are paid by interest on PRIN MMA
    No yearly money is put into Lenders RSF; all remaining balance will be added to Rollover
    Amount
After Year 17 - Total amount of PRIN paid by H.O. must now go to paying down the
$250K loan.
Around the 20th Year - The yearly amount of paid INTEREST and PRIN by the
H.O. is equal.
After this 20th year, the AMF becomes a worse alternative than the conventional 30 FRM for the
Homeowner.
```

Accordingly, the present convention provides a novel system and method for computing repayment principal and interest on a loan so as to pay down the principal amount more rapidly in the beginning term of the loan and allowing the homeowner and lender to share in any possible risks and benefits achieved by rising or lowering interest rates.

The present invention is not intended to be limited to a system or method that must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A method of processing loan payments, comprising the acts of:

receiving, by an automated system, a loan principal amount, a loan repayment computational time frame, an initial loan interest Index value, and a loan interest value;

responsive to said received loan principal amount, said loan repayment computational time frame and said loan interest value, by said automated system, a monthly loan repayment amount, said monthly loan repayment amount including a conventional principal loan repayment component and a conventional loan interest component;

responsive to calculating said monthly loan repayment amount, calculating, by said automated system, of a modified loan repayment schedule, said modified loan repayment schedule including a modified monthly principal component value and a modified monthly interest component value, wherein said modified monthly principal component value is calculated as the difference between said conventional principal loan repayment component and an average of all of said calculated monthly conventional principal loan repayment components over said loan repayment computational time frame, and wherein said modified monthly interest component value is calculated as the difference between said conventional loan interest component and an average of all of said calculated monthly conventional loan interest components over said loan repayment computational time frame, and wherein the sum of said calculated modified monthly principal component value and said calculated modified monthly interest component value for said loan repayment computational time frame is equal to the sum of said conventional principal loan repayment component and said conventional loan interest component for said loan repayment computational time frame; receiving said monthly loan repayment amount from a borrower, said loan repayment amount including an amount allocated to said modified monthly principal component value and an amount allocated to said modified monthly interest component value; responsive to receiving each said monthly loan repayment amount from said borrower, transferring said amount allocated to said modified monthly principal component value to an interest bearing account; responsive to receiving each said monthly loan repayment amount from said borrower, computing a present loan interest Index value; computing, by said automated system, of a difference between said initial loan interest Index value and said present loan interest Index value and using said difference, computing a present monthly loan interest value and subsequently computing, by said automated system, of a difference between said modified monthly interest component value and said computed present monthly loan interest value;

if said computed difference between said modified monthly interest component value and said computed present monthly loan interest value is a positive value, depositing an amount equal to the difference between interest on said loan principal amount computed using said initial loan interest Index value and interest on said loan computed using said present loan interest Index value into one or more interest-bearing accounts, wherein one half of said deposited amount is allocated to a lender's benefit and one half of said deposited amount is allocated to a borrower's benefit; and if said computed difference between said modified monthly interest component value and said computed present monthly loan interest value is a negative value, determining if there are enough funds in the borrower's benefit portion in said interest-bearing account, if there are enough funds in said borrower's benefit portion in said interest-bearing account, withdrawing the required computed present monthly loan interest value, and if there are not enough funds in said borrower's benefit portion in said interest-bearing account, collecting the required computed present monthly loan interest value from another account or from said borrower.

2. The method of claim 1, wherein said act of collecting the required computed loan interest from another account proceeds in the following order: first in an amount equal to no more than the difference between the modified monthly principal component value and the conventional principal component value paid to date by the borrower; next in an amount equal to no more than one half the amount deposited in said interest-bearing accounts and allocated to said lender; and lastly directly from said borrower by means of an additional monthly payment charge.

* * * * *